Figure 2:
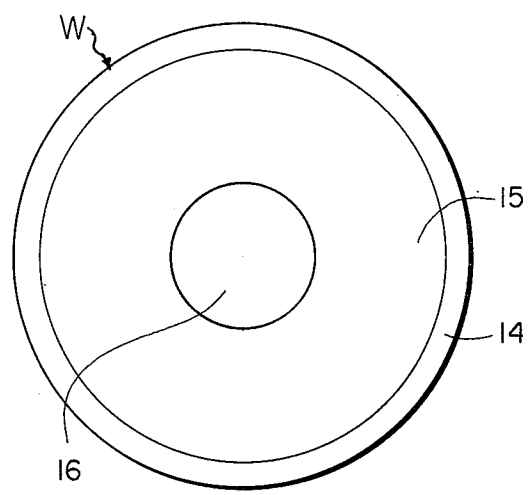

United States Patent [19]

Lindstrom et al.

[11] 3,957,461

[45] *May 18, 1976

[54] METHOD FOR PREPARING DIAMONDS FOR USE WITH GRINDING WHEELS

[75] Inventors: Olle Lindstrom, Taby; Erik Lundblad, Robertsfors, both of Sweden

[73] Assignee: Allmanna Svenska Elektriska Aktiebolaget, Vasteras, Sweden

[ * ] Notice: The portion of the term of this patent subsequent to Sept. 9, 1992, has been disclaimed.

[22] Filed: Nov. 23, 1971

[21] Appl. No.: 201,491

Related U.S. Application Data

[63] Continuation of Ser. No. 13,504, Feb. 24, 1970, abandoned, which is a continuation-in-part of Ser. No. 538,335, March 29, 1966, Pat. No. 3,904,391, which is a continuation-in-part of Ser. No. 479,810, Oct. 19, 1965, abandoned.

[52] U.S. Cl.................................. 51/295; 51/298 A
[51] Int. Cl.².................... C09K 3/14; C23C 5/00
[58] Field of Search .............. 51/295, 298, 299, 309

[56] References Cited
UNITED STATES PATENTS 2,216,728  10/1940  Benner et al. ....................... 51/295
3,125,418  3/1964  Wentorf............................... 51/295

FOREIGN PATENTS OR APPLICATIONS
1,142,688  9/1957  France................................. 51/295

*Primary Examiner*—Donald J. Arnold
*Attorney, Agent, or Firm*—Brumbaugh, Graves, Donohue & Raymond

[57] ABSTRACT

A grinding element having a grinding section comprising diamond particles individually embedded in a resin binding medium with improved performance characteristics is provided, along with a method of making same. The improved characteristics are obtained by utilizing a metal coating on the diamond particles in the grinding section, which metal coating has a thickness of between 0.5 and 25 microns, preferably 5 to 20 microns, to impart to the section superior grinding properties to those which can be obtained with a like section wherein the diamond particles are not so coated.

6 Claims, 3 Drawing Figures

INVENTOR.
OLLE LINDSTROM
ERIK LUNDBLAD

ATTORNEYS

METHOD FOR PREPARING DIAMONDS FOR USE WITH GRINDING WHEELS

This is a continuation of application Ser. No. 13,504, filed Feb. 24, 1970, and now abandoned, which is a continuation-in-part of application Ser. No. 538,335 filed Mar. 29, 1966 and now U.S. Pat. No. 3,904,391, which is in turn a continuation-in-part of application Ser. No. 479,810 filed Oct. 19, 1965, and now abandoned, priorities of which are fully herein claimed.

BACKGROUND OF INVENTION

The present invention relates to a resin bond grinding element having diamond particles distributed throughout and individually embedded in the resin bond. In particular, the present invention is directed to such a grinding element wherein a metallic coating is utilized on the diamond particles for purposes of improving the performance characteristics of the grinding element.

In order to determine the performance characteristics of the grinding element, it has been an accepted procedure for some period of time to utilize the grinding ratio. The grinding ratio is defined as the ratio of the volume of material removed from the workpiece during a given grinding operation to the volume of material worn away from the grinding element during that grinding operation.

For commercial purposes, grinding ratios are particularly significant in relation to so-called diamond grinding wheels, because as known throughout the trade, diamond grinding wheels are comparatively expensive. Therefore, to ascertain the commercial feasibility of using a diamond grinding wheel, one must know the performance characteristics of that grinding wheel, or specifically, the numerical value of the grinding ratio.

The numerical value of the grinding ratio, as defined above, is with respect to a given grinding operation. Thus for a particular operation, a given grinding wheel may have a given grinding ratio, whereas for another operation, that same grinding wheel may have a different grinding ratio. Even so, the grinding ratio for the particular operation to be performed is the significant factor to consider in determining cost.

Viewed consistent with the above, the present invention permits one to obtain a superior grinding ratio for a given grinding operation. In terms of superior grinding ratio, one must realize that this is a comparitive figure. Accordingly, for purposes of determining superiority, one can compare the grinding ratio which is obtained with a wheel made in accordance with the invention to, as a relative standard, the grinding ratio of the most efficient corresponding prior art grinding wheel, namely, a wheel which is otherwise identical to that made in accordance herewith except for the fact that the diamond grains are not coated with metal and the metal material of the coating is replaced by the material of the resin bond.

While the grinding ratio will vary with the particular grinding operation to be performed, one must not overlook the fact that the grinding ratio will also vary depending on the concentration of diamond grains within the grinding element.

Concentration is determined by taking the weight of diamond per unit volume of the finished grinding element. The grinding element for this purpose is the active section of the grinding wheel, namely, that section which contains diamond grains.

In the diamond grinding wheel art, a figure of 100 has been taken for many years as the concentration where the weight of the diamond grains is 72 carats/in$^3$ or 4.4 carats/cm$^3$ (carat = 0.2 grams). The carats per cubic inch or grams per cubic centimeter vary linearly with increases or decreases in concentration from such standard of 100 so that for a concentration of 50, for example, the diamond grains are present in an amount of 36 carats/in$^3$ or 2.2 carats/cm$^3$ and for a concentration of 200, the diamond grain is present in an amount of 144 carats/in$^3$ or 8.8 carats/cm$^3$.

Those skilled in the art have long recognized that for practical purposes, the concentration of diamond grinding wheels varies between approximately 25 and 200 (1.0 – 9.0 carats/cm$^3$), but the preferable concentration is between 50 and 100 (2.2 – 4.4 carats/cm$^3$) because the increase in grinding ratio with increased concentration for most operations tends to become insignificant at concentrations above 100 and because the wheel at least tends to glaze, rather than grind, when the ratio is less than 25.

Considering the aforesaid variables, it should be apparent that an evaluation of improved performance characteristics of any grinding element necessarily requires a comparison of grinding ratios of respective grinding elements as used for a particular grinding operation, where the respective elements have the same concentration. To phrase this another way, in order to determine improved performance of a diamond grinding element, one must use a "standard" grinding element for comparison purposes, which standard element has not only the same size and shape, but also the same diamond concentration as the element to be evaluated.

Since most all commercial grinding wheels have a grinding element or section with a diamond concentration between 50 and 100, and since within this range, the grinding ratio increases with an increase in concentration, realistic evaluations of performance characteristics desirably utilize wheels having grinding sections with concentrations at the upper end of the range, i.e., concentrations of 100.

In addition to understanding the importance of the meaning of grinding ratios and the importance of diamond concentration used in making the active grinding element of diamond grinding wheels, it is helpful to further understand the meaning of the accepted terminology in the art regarding particle size. In this regard, it should be stated at the outset that there is from a realistic standpoint no practical manner in which to make a diamond grinding wheel wherein the diamond particles all have the same size. To the contrary, in any grinding wheel having a diamond grinding section, diamond particles that are incorporated necessarily vary in size, although the sizes of particles in any diamond grinding element conventionally fall within a prescribed range.

When those skilled in the art speak in terms of a diamond grinding wheel, they are talking about diamond particles which have a particle size of a maximum of 420 microns (40 mesh). Obviously, then, the particles are so small that one does not distinguish between particle sizes by accurately measuring each particle as this would be a virtual impossibility.

In the circumstances, the diamond grinding element industry has developed standards relating to particle size. These standards effectively separate particle sizes into selected ranges. More particularly, particles having a size within a predetermined range are separated from a mass by sieving the mass through respective upper and lower screens wherein the upper screen has a larger mesh size than the lower screen. Particles which have a size larger than that within the selected range remain on the top screen and particles which have a size smaller than that within the selected range pass through the lower screen. Accordingly, in a random mass, one selectively screens particles having sizes between the upper limit prescribed by the upper screen mesh size and the lower limit prescribed by the lower screen mesh size.

Recognizing the above, and consistent with standards long established in the diamond grinding element industry, one finds that there are standard diamond sizes prescribed (at least as early as 1961) by ASTM Standard E11.

Consistent with this standard, the particle sizes are grouped according to screen mesh size and, in turn, micron particle size. This grouping is in accordance with the following chart:

| Mesh | Microns |
| --- | --- |
| 40–50 | 420–297 |
| 50–60 | 297–250 |
| 60–80 | 250–177 |
| 80–100 | 177–149 |
| 100–120 | 149–125 |
| 120–140 | 125–105 |
| 140–170 | 105–88 |
| 170–200 | 88–74 |
| 200–230 | 74–62 |
| 230–270 | 62–53 |
| 270–325 | 53–44 |
| 325–400 | 44–37 |

Since the particles involved are so small and since one takes a random mass of particles from which particles having a size within the prescribed range are separated, the number of particles of any given size within the range varies such that there are a minimum number of particles having sizes at either end of the range and a maximum number of particles having sizes in the middle of the range so that the curve of distribution of particle sizes within the selected range is a Gauss distribution curve (generally bell shaped).

Notwithstanding the particle size distribution within any selected range, it should be apparent that the larger the selected range of particle sizes the coarser the grinding finish, and the smaller the selected range of particle sizes, the finer the grinding finish. Since the user intends to obtain a particular type of grinding finish with any diamond grinding wheel, particles in various different size ranges are not generally mixed within the same wheel. In fact, those familiar with the art recognize that if particles within a smaller size range are mixed with particles within a relatively larger size range, the particles within the relatively small size range are essentially ineffective because the work to be performed during the grinding operation falls on the particles in the larger size range.

Accordingly, in the diamond grinding wheel industry, it is to be expected that any given wheel incorporates diamond particles having a size within only one of the ranges set forth in the above chart.

Although commercial diamond grinding wheels can have particles within any one of the ranges shown in the chart, one of the most popular ranges for such wheels is the 100–120 mesh or 149–125 microns group. Therefore, for comparative analytical purposes, this middle group particle size range has been traditionally selected. At the same time, it is to be understood that the present invention is in no way limited to this particle size range, and instead, the same is mentioned here for explanatory purposes.

BASIC ASPECTS OF THE INVENTION

Having now discussed the meaning of the term "grinding ratio", the meaning of "diamond concentration", and the meaning of "particle size", all as used in relation to making diamond grinding elements, attention can be directed to certain basic aspects of the significant improvement provided by the invention.

In this regard, comparative results are particularly useful. Specifically, if one compares the results which can be achieved with a diamond grinding element utilizing the invention against the results which can be obtained with the equivalent grinding element as previously produced, then the startling nature of the improvement becomes readily apparent.

The term "equivalent element" establishes the reference, and therefore, the characteristics of this reference in terms of wheel type, diamond concentration, particle size, grinding ratio, and method of manufacture are important.

For practical purposes, there are essentially two types of diamond grinding wheels, namely, one type in which the binding medium is a cured synthetic resin, and another type in which the binding medium is metal. The present invention is not concerned with the type of wheel in which the binding medium is metal. To the contrary, it is specifically concerned with and limited to the type of grinding wheel in which the binding medium is cured synthetic resin, normally called a resinoid diamond wheel.

Grinding wheels of this type commonly include a hub portion having a central bore therein adapting the hub portion to be mounted on a shaft or spindle. The hub portion is itself formed from some suitable support material commonly used in the art such as steel, bakelite or a light metal. Carried on the periphery of the hub portion in a position to make effective contact with a work piece, is the effective grinding section. This section commonly has a thickness of the order of either one-fourth or one-eighth inch (approximately 6mm and 3mm respectively). It is this section which includes the cured synthetic resinbinding medium having diamond particles embedded therein.

Usually the grinding wheels are either of disk shape or cup shape. In the disk shape wheel the effective diamond grinding section extends entirely about the periphery whereas in the cup shape wheel the effective diamond grinding section extends about the outermost peripheral area.

Taking a grinding wheel of a prescribed configuration, whether it be cup shaped or disk shaped, having an effective grinding section thereof of predetermined configuration, and stating that the grinding section has a synthetic resin-binding medium defines the general nature of the wheel. As noted above, a specific definition of the wheel includes a recitation of at least the diamond concentration in the effective grinding section, the range of diamond particle sizes utilized, and the method of manufacture.

Even further, for completeness and to be particularly specific, consideration can be given to the type of diamond particles used in the grinding section and the manner in which that section was made. Generally, natural diamonds have relatively smooth crystal surfaces, as distinguished from the more jagged type of surfaces which are normally found on synthetically made diamond particles. Thus, a definition of the equivalent element would specify the type of diamond utilized.

Since the present invention is particularly concerned with producing a diamond grinding wheel of the type having a diamond grinding section incorporating cured synthetic resin, and since the best previous performance which could be obtained from grinding wheels, to our knowledge, was realized when jagged synthetic diamond particles were utilized therein, the term "equivalent wheel" or "equivalent element" as used in this specification refers to a wheel or element incorporating such diamond particles.

In short, where the terms "new wheel" and/or "new grinding element" are used in this specification, it is to be understood that these terms refer to a wheel or element made consistent with the invention. Where the term equivalent wheel and/or equivalent element are used in this specification, they refer to a wheel or element having the same shape, size, configuration, hub material, size range of diamond particles, type of diamond particles, and composition for the diamond binding medium, as the new grinding wheel or new grinding element. Further, the equivalent wheel and/or equivalent element is made according to the best techniques known to us.

Using the equivalent wheel and/or equivalent element as a standard, the invention resides in providing a diamond grinding wheel or element having a cured synthetic resin binding medium with diamond particles embedded therein, which wheel or element has a superior performance (superior grinding ratio) to the performance of an equivalent grinding wheel or element. To obtain the superior performance, which is in fact startling, the invention contemplates providing a metal coating on the diamond particles which coating has a thickness falling within the range between 0.5 and 25 microns, preferably 5–20 microns, so selected that the new grinding wheel or element has a substantially higher grinding ratio for any given grinding ratio for any given grinding operation than an equivalent wheel.

Figure 3:
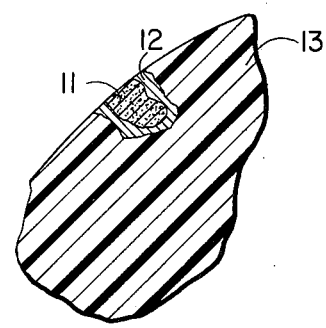
Figure 1:
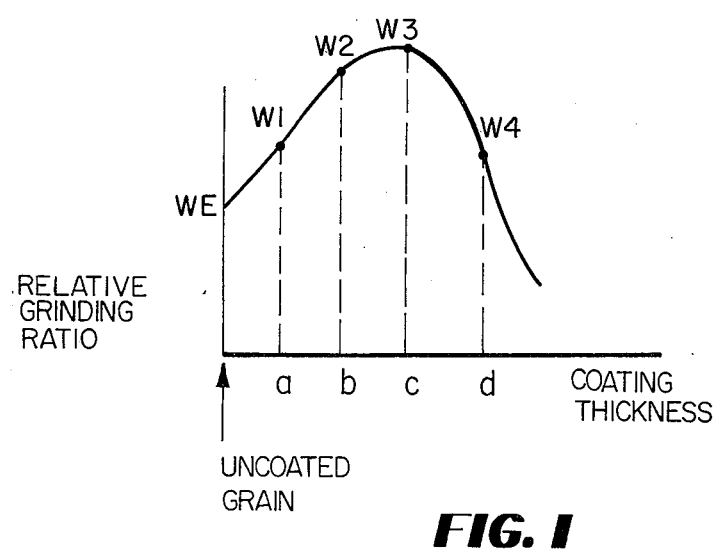

The invention, as well as the advantages thereof, will be better understood by reference to the following detailed description, Such description makes reference to the annexed drawings wherein:

FIG. 1 is a schematic graphical presentation demonstrating the superior results which can be obtained according to the invention;

FIG. 2 is a plan view of one type of grinding wheel to which the present invention can be applied; and, FIG. 3 is a fragmental detailed sectional view showing illustratively the relationship between a diamond grain, the coating thereon, and the synthetic resin-binding medium as incorporated in the effective grinding section of a grinding wheel or other device or element made according to the invention. The grains are uniformly distributed in the grinding section.

For purposes of understanding the schematic presentation made in FIG. 1, let it be assumed that there are five grinding wheels, one of these grinding wheels, which we will call for convenience W1, is made in accordance with the present invention with the coating on the diamond particles having a thickness of $a$ microns. The second, third and fourth diamond wheels, which we will call for convenience W2, W3 and W4 are also made in accordance with the present invention and they are identical to W1, except that they have coatings on the diamond particles of respective increased thicknesses, $b$ microns, $c$ microns and $d$ microns. The fifth grinding wheel, which we will call for convenience WE, is an equivalent grinding wheel, namely, it is a diamond grinding wheel identical to grinding wheels W1 through W4 inclusive, except for the fact that it has no metal coating on the diamond particles. Instead, the diamond particles are in direct contact with the synthetic resin binding medium as opposed to being coated, so that the coating, rather than the face of the diamond particles is in direct contact with the synthetic resin binding medium.

Having the five grinding wheels mentioned above at hand, and wishing to test the relative performance of each, one must first select a given grinding operation because, as explained previously, performance is determined in terms of numerical values of grinding ratio. Since the grinding ratio is dependent upon the type of workpiece and type of grinding conditions, a true comparative test would only be meaningful if all five wheels were tested under exactly the same circumstances. Therefore, we select a given grinding operation, meaning a given grinding job, to be done with a given type of workpiece, under given grinding conditions.

Having so selected the given grinding operation, the grinding is carried out for a suitable length of time with each of the five wheels mentioned above. The wheel WE grinds away a certain amount of the workpiece during the interval in which it is used. Moreover, a certain amount of the material of the grinding section of this wheel is worn away during the interval that it is used for this grinding operation. By standard techniques, the volume of material ground from the workpiece is determined and the volume of material worn from the grinding section of the grinding wheel is determined. Having determined these figures, the grinding ratio for the wheel WE, namely, the equivalent wheel, is established. Relating this to FIG. 1, the value of this grinding ratio is represented by the point WE in FIG. 1.

Each of the successive wheels W1 through W4 inclusive are subjected to the same grinding operation and the volume of material ground from the workpiece and volume of material worn from the grinding wheel is determined in each instance. From these determined figures, grinding ratios are calculated for each of the wheels W1, W2, W3 and W4. When these grinding ratios are plotted as shown in FIG. 1 in relation to thickness of the metal coating on the diamond particles, one finds a resulting graph conforming with that schematically presented in FIG. 1, provided that the thickness values $a$, $b$, $c$, and $d$ are between 0.5 and 25 microns and preferably 5 and 20 microns.

This graphical representation will have the same general contour regardless of the shape, size or configuration of the wheel, regardless of the type of diamond particle used, regardless of the type of synthetic resin-binding medium employed, regardless of the range of particle sizes utilized and regardless of the diamond concentration.

Thus, for any resin bonded diamond grinding element which inherently refers to a grinding element having a suitable synthetic resin-binding medium with diamond particles embedded therein, which diamond particles have sizes within one of the ranges charted above, there will be a superior grinding ratio where the invention is employed to that which is achieved with an equivalent grinding wheel or element.

The metal of the coating utilized according to the invention serves several functions, and in turn, imparts to the ultimate grinding element, or specifically the effective grinding section thereof, the superior performance characteristics. In particular, the metal presents to the surrounding synthetic resin-binding medium a surface texture which is rougher than the underlying surface texture of the coated diamond. This roughened texture enhances the bond with the synthetic resin-binding medium. The metal coating additionally serves as a heat transmitting means thus distributing over an effectively larger area heat generated due to friction by the grinding action of the diamond particles against the workpiece. Additionally, since the metal coating encapsulates the diamond particle, fractures in diamond particle do not automatically result in complete loss of the fractured material. To the contrary, the metal coating essentially forms a socket that tends to retain the fractured diamond material within the resin binding medium.

Obviously, in providing these functions, the metal coating is desirably sufficiently thick to perform the functions at near optimum level, but at the same time, it is sufficiently thin so as to not interfere with the overall efficiency of the grinding element. In other words, as should be obvious, the optimum characteristics will be obtained with thicker coatings on larger sized diamond particles and with thinner coatings on smaller sized diamond particles. Still, for particle sizes utilized in diamond particle grinding wheels, the coating thicknesses will range between 0.5 and 25 microns and it appears that substantially all, if not all maxima of grinding ratios for such grinding wheels will occur when the thickness of the coating is in the preferred range, namely, between 5 and 20 microns.

The right-hand side of the schematic curve presented in FIG. 1 is shown as extending below the grinding ratio for the exemplary wheel WE used in the preceding discussion. In essence, this means that possibly in some instances, a diamond grinding element having the diamond particles therein with a coating thickness above, for example, 20 microns, may have an inferior grinding ratio to an equivalent element. Even so, there is a range of metal coating thicknesses which can be used on those particles and which when so used imparts to the ultimate grinding element a superior performance over the equivalent element and thus, the invention is still applicable. Specifically, for any diamond grinding wheel or element having the diamonds embedded in a synthetic resin-binding medium and having a given range of particle sizes within the aforesaid charted limits inherently imposed on diamond grinding wheels, there is a range of metal coating thicknesses between 0.5 microns and 25 microns that imparts superior performance to the final grinding element. Thus, as should be readily apparent, the invention resides in the utilization of a metal coating having a thickness within the range of thicknesses that imparts superior performance to the ultimate resin bonded diamond grinding element, which range of thicknesses is, in any event, between 0.5 microns and 25 microns and preferably between 5 and 20 microns.

The metal coating thus serves as a means for imparting to the resin bonded diamond grinding element in which it is used, a superior performance to that which can be achieved with an equivalent element.

It should be obvious that for any given grinding operation, range of particle sizes, and/or concentration, the grinding element or wheel will have metal coating thickness which affords optimum results, namely, a coating thickness at the peak of its particular performance curve. In the graphic representation of FIG. 1, the wheel W3 is at or near this maximum point. However, it should also be obvious that it may be impractical from the commercial standpoint to have a different grinding wheel for every possible grinding operation which a customer may desire to carry out, and therefore, from a practical standpoint, anyone of ordinary skill in the art would make curves for various different types of rather commonly used grinding operations, and if the thickness of the coating giving optimum results for each operation differs, a compromise would be made on the coating thickness so as to give substantially superior performance for each one of the different types of grinding operations, even though possibly not the optimum performance for any one. This rather obvious factor is mentioned only to emphasize the superiority provided by the invention even under compromise conditions where advantage is taken of significant benefit, without necessarily taking advantage of optimum benefits.

Metals

Suitable metals include cobalt, nickel and/or silver. Additional metals include cadmium, zinc, copper, iron, tin, molybdenum, titanium, manganese, aluminum, chromium, gold, tungsten, zirconium, platinum group metals and combinations and alloys thereof.

Manufacturing Technique

Utilizing one of the aforesaid metals, such as, for example, nickel, synthetic diamond grains are coated therewith to a thickness within the prescribed range. The coating can be achieved by any well known technique, including those discussed below. Following the coating operations, the coated grains are mixed with a filler and with a suitable resin. The mixture is cold pressed by conventional techniques and then heated in a mold for sufficient time to cure the resin. The molded unit is then removed from the mold and after hardening further, machined to its final shape.

Such procedure is desirably utilized in making a grinding wheel such as shown in FIGS. 2 and 3. In FIG. 2, the grinding wheel W is shown as including a hub 15 having a central bore 16 and a peripheral grinding section or path 14. The hub 15 can be steel, light metal or bakelite. The grinding section 14, for example, having a thickness of approximately 3mm, is made according to the invention so as to provide a grinding wheel consistent herewith wherein, as shown in FIG. 3, the diamond grain 11, as coated with metal 12, is embedded in the binding medium 13.

To this end, the following examples illustrate the technique of making such a wheel.

EXAMPLE 1

A synthetic diamond grain with diamonds of at the most 80 mesh (maximum particle size 177 microns) is coated with nickel to a thickness of approximately 10–15 microns. Thereafter, these particles are mixed with phenolic resin and a filler (silicone carbide). The mixture is then cold pressed in a mold and the mixture is heated in the mold to approximately 160° for approximately 24 hours so that the phenolic resin hardens.

The hardened element is then taken out of the mold and further hardened. Finally, it is machined to its ultimate shape.

EXAMPLE 2

A suitable resin bond is prepared from a phenolic resin of the novolak type (1.2 moles phenol per mole formaldehyde) containing 16 parts by weight hexamethylene tetramine and 100 parts by weight of novolak, which is heated to 110°C, whereupon it is crushed and mixed with a filler such as silicon carbide and some calcium oxide (resin 38.8 per cent by weight, calcium oxide 1.2 percent by weight, silicon carbide 600 mesh, 60 percent by weight). In order to manufacture a 100-concentration diamond grinding wheel metal-coated diamond grits are added so that the concentration of diamond grits calculated as untreated diamonds will be 72 carats/in$^3$ of the diamond section.

The mixture is moulded at a temperature of about 160° for half an hour by which time the resin is cured. The wheel obtained is then removed from the mould and given a final cure at a temperature of 150°C for 24 hours and machined to shape.

Having considered some of the broader and more basic aspects of the invention, attention is now directed to specfic aspects with respect to particle specification, suitable metals, suitable coating techniques, preferred concentrations, general manufacturing techniques, and specific examples.

Particle Specifications

The diamond particles utilized in accordance herewith are preferably synthetic and a particle size of 40 mesh or greater (420 microns or smaller), although preferably they have a particle size of 80 mesh or greater (177 microns or smaller). Of course, by virtue of the accepted sizing techniques, the micron size means that the particles will pass through a wire screen having that micron size openings.

Resins and fillers

As suggested by Example 1, it should be understood that various phenolic resins, e.g., of novolak and resol type, mixed with fillers may be used instead of the type of resin specifically mentioned in Example 2.

Moreover, other types of resinous binders with or without a filler can be used as well, such as epoxy resins, polyimides, alkyd resins, unsaturated polyester resins, silicones, polybenzinimidazoles, polyamidimides, etc. whether the diamonds are used for manufacturing diamond wheels or other resin-bonded grinding materials. By using fillers the amount of filler is suitably 30 to 85, preferably 40–80, percent by weight of the total amount of resin and filler. Besides silicon carbide other fillers may be used such as corundum and boron carbide.

Coating Procedures

Regardless of the type of resin and/or filler used, and regardless of the exact molding, curing and machining techniques employed, the thickness of the coating on the diamond particles is controlled, as indicated. To this end, the coating thickness is essentially in the range between the limits of 0.5 – 25 microns, preferably 5–20 microns, and for wet grinding, suitably 10–15 microns to achieve optimum properties in the ultimate grinding element, namely, good grain adhesion and good grinding characteristics.

Such a layer, which can be applied in any one of several known ways, including those detailed below, provides a rougher surface than an uncoated diamond grain, thus providing better adhesion toward the resin binder. In addition to serving as a means for transmitting the heat developed during a grinding operation over a larger mass. Such heat, resulting from friction of the grain against the workpiece, is then dissipated, thereby avoiding extreme temperature peaks in the grains and in turn thermally caused aging effects in the adjacent plastic surface. Since the thickness of the layer is many times greater than a monomolecular layer (>0.5 microns), it also serves as a means providing a mechanically strong shell around the diamond grains which helps maintain splintered diamond material together.

Such diamond grains, as indicated, are coated with the selected metal to the prescribed thickness in accordance with a suitable technique. Such techniques include gas reduction, chemical reduction and electrolysis, all of which, as well known, are carried out either at ambient pressure or under relatively low pressure conditions. The following examples illustrate suitable coating procedures.

EXAMPLE 3

Nickel Coating - Gas Reduction (A)

This method consists of elutriating suitably activated diamond grains in a solution of ammoniacal nickel sulphate, which solution is reduced by hydrogen at approximately 180°C and under a pressure of 20 atm. (over pressure) so that the nickel precipitates on the diamond grains. The activation can suitably be made with palladium.

EXAMPLE 4

Nickel Coating - Gas Reduction (B)

Nickel is reduced on diamond grits of 140 mesh – 170 mesh size in an autoclave under hydrogen at a pressure of 20 atm. from an aqueous solution of a nickel salt containing 230 g/l NiSo$_4$ . 6 H$_2$O, 300 g/l (NH$_4$)$_2$SO$_4$ and 130 ml concentrated aqueous ammonia/l, the diamonds being dispersed in the solution. The autoclave is equipped with a stirrer and the reduction takes place at a temperature of 160°C – 170°C. The reduction is started by adding small amounts of catalyst such as anthraquinone. The treatment is repeated until the thickness of the layer has reached the desired value.

EXAMPLE 5

Cobalt - Nickel Coating

This is an example of a method of coating diamond grits with a layer consisting of several metals. A mixture of cobalt and nickel is precipitated by reduction from an ammoniacal solution of cobalt, nickel and ammonium sulphates on diamond grits (100 mesh – 120 mesh) activated with palladium chloride in the same way as described in Example 6. A reaction vessel is filled with a solution containing per liter: 300 g/(NH$_4$)$_2$SO$_4$, 140 g CoSO$_4$. 7 H$_2$O, 90 ml concentrated aqueous ammonia and NiSO$_4$ . 6 H$_2$O. This yields a concentration of 9g nickel/l. Hydrogen is conveyed into this solution, in which the activated diamond grits have been placed, under a pressure of 13.5 atm. at a temperature of 200°C – 210°C. After 150 min a cobalt-nickel coating is obtained on the diamond grits. The layer is about 5 microns thick, and consists of 39.0% Co and 4.3% Ni by weight of diamond.

EXAMPLE 6

Nickel Coating - Chemical Reduction 25 carats of diamond grits of 40 mesh – 60 mesh are cleaned in a mixture of equal parts of concentrated nitric acid and hydrochloric acid and rinsed thoroughly in distilled water, whereupon they are activated for 10 min each in the following two aqueous solutions: 5 g $SnCl_2$ + 10 HCl/l and 0.2 g $PdCl_2$ + 1 ml HCl/l. The activated diamonds are then dipped at a temperature of 70°C in an aqueous solution containing 30 g/l $NiSO_4$. 7 $H_2O$, 10g/l $NaOCOCH_3$ . 3 $H_2O$ and 10 g/l $NaH_2PO_2$ . $H_2O$. The acidity is adjusted to pH 5 with $CH_3COOH$.

EXAMPLE 7

Nickel Coating - Electrolytical

This is a method of coating, differing from those described above, wherein electrolytical disposition is utilized, and in particular electrolytical disposition of nickel. Synthetic diamond grits of 80 mesh – 100 mesh are cleaned by boiling in concentrated $HNO_3$ and rinsed in distilled water. The diamond grits are then silvered by reduction of silver from an ammoniacal solution of silver nitrate and a reducing agent, for example, according to Brashear, Handbook of Chemistry and Physics, 44th Edition. The thickness of the layer obtained is less than 0.25 microns. The object of the silvering is to make the diamond grits electrically conducting. The thickness of the layer can range from molecular layers to some tenths of a micron. 75 carats of the silvered diamond grits are transferred to a rotatable cylindrical drum, containing an aqueous solution of $NiSO_4$ . 6 $H_2O$ (140 g/l) $NH_4Cl$ (30 g/l), $H_3BO_3$ (30 g/l). A nickel anode is placed above the diamond grits, while the cathode is connected to the drum containing the diamond grits. The current is switched on and the current density is adjusted so that a value of about 20 $mA/cm^2$ area of the top layer of the diamond grits facing the anode is obtained. The drum is rotated at a speed of 1 – 2 rpm. The electrolysis is continued for about 24 hours, whereupon the diamond grits are removed, rinsed and dried. The thickness of the layer is by then 25 microns.

EXAMPLE 8

Cadmium Coating 3000 carats of 100/120 mesh size synthetic diamond grits are cleaned by boiling in concentrted nitric acid and rinsed in distilled water.

The diamond grits are then made conductive by applying a thin silver layer on the surface. This is done by standard methods, i.e., using an ammonical solution of silver nitrate and d-glucose as reducing agent. This is the well-known Brashear method and is described in, for example, Handbook of Chemistry and Physics, 44th Edition.

The thickness of the silver layer ranges from molecular layers to some tenths of a micron.

The silvered diamond grits are then transferred to an epoxy resin electrolytic plating drum. The drum has an internal diameter of 120 mm and a length of 200 mm. On the inside surface of the drum multiple titanium cathodes are fastened parallel to the axis of the drum and at distances of 30 mm each.

In the middle of the drum there is fixed an anode made of pure cadmium and having a diameter of 75 mm and a length of 175 mm.

The drum is filled to two-thirds of its volume by an aqueous solution made from cadmium oxide (22 gm/l) and sodium cyanide (75 gm/l). The temperature of the solution is 25°C. The drum is then closed and placed in a horizontal position. The silvered diamond grits are now on the bottom of the drum and in contact with at least two of the titanium cathodes.

An electric current is passed to the solution and adjusted so that the current density reach a value of 20 mA per $cm^2$ area of the top layer of the diamond grits. With the drum rotating at a speed of 2 RPM, the electrolysis is continued for 21 hours. The drum is thereafter opened and the diamond grits removed, rinsed and dried. The diamond grits are now covered by a continuous layer of metallic cadmium, the thickness of which was determined to be 16.4 microns.

EXAMPLE 9

Cadmium Coating 3000 carat of 140/170 mesh diamond grits are treated in the same manner as was described in Example 8.

The plating time is in this case only 18 hours at the same current density. The speed of the drum is lowered to 1 RPM. The coating thickness is then determined to be 8.7 microns average.

EXAMPLE 10

Tin-Nickel Coating 3000 carats of 100/120 mesh synthetic diamond grits are silvered as described in Example 8 and transferred to the same plating drum as previously described in that example.

The anode is however now made from pure nickel. The drum is filled to two-thirds of its volume with an aqueous solution of $SnCl_2$ . $2H_2O$ (60 g/l): $NiCl_2$ . $6H_2O$ (300 g/l) and $NH_4$ . $HF_2$ (56 g/l). The temperature of the solution is raised to 68°C and the pH adjusted to 2.0. The drum is rotated at a speed of 2 RPM and the current adjusted to a density of 12 mA per sq. cm area of the top layer of the diamond grits.

The applied electrical energy is measured by an Amp-hour meter. For each Amp-hour used 2.05 g of $SnCl_2$ . $2H_2O$ was added to keep the concentration of the plating solution constant. The plating is continued for 24 hours whereupon the grits are removed rinsed and dried. The coating thickness is determined to be 7.6 micron. Chemical analysis of the metallic layer showed that the alloy contained 64.6% by weight of tin and 35.4% by weight of nickel.

EXAMPLE 11

Tin-Nickel 3000 carat 80/100 mesh size diamond grits are treated in the same way described as in Example 10.

The plating time was prolonged to 35 hours and the resulted coating thicknesses proved to be 13.0 micron thick. Chemical analyses of the metallic layer gave 65.1% per weight tin and 34.9 percent by weight nickel.

Instead of silvering, the diamond grits can be coated with a conducting layer of another metal, which can be precipitated, vaporized or applied in some other way. Examples of such layers are gold; platinum group metals, such as platinum or palladium; copper; nickel; aluminum; cobalt; and other metals with good electrical conductivity.

When using a conducting layer, according to the invention, this layer suitably has a thickness in the range from a molecular layer to about 5 microns and preferably in the range from a molecular layer to about one micron.

Instead of the current density value exemplified above, other current densities of at least 10 mA/cm$^2$ area of the top layer of the diamond grits facing the anode may be used for applying the outer layer, preferably accompanied by stirring. These current densities may be used for most types of electrolytes when depositing the outer layer of different metallic materials according to the invention.

Diamond Concentrations

The quantity of diamond material included within the resin binding medium can be varied. Specifically, the concentration of diamonds calculated as untreated diamond grits can be varied between the limits 1.0 – 9.0 carats per cm$^3$ of the diamond section, preferably 2.2 – 4.4 carats per cm$^3$. One carat is 0.2 g.

Having now described various embodiments of the invention, what is claimed is:

1. In a method for producing a grinding element having an effective grinding section including a body of cured resin material suitable for use as the bonding medium in a grinding element and diamond particles individually embedded in said cured resin, the improvement comprising the step of forming on the surface of discrete diamond particles a substantially continuous metal coating on and encapsulating said particles having a thickness of between 0.5 and 25 microns to be embedded in the resin material, said coating conforming substantially to the surface configuration of respective ones of said discrete particles, wherein said particles are bonded to said resin through said coating, wherein said diamond particles are of a size and form suitable for use as the abrasive particles in an effective grinding section and have a particle size smaller than 420 microns, wherein the thickness of said metal coating within the stated range is of a magnitude to impart to said body a grinding ratio which exceeds that of a given bare diamond grinding element, wherein said given bare diamond grinding element is identical to said body in every respect except the metal coating material is replaced by said cured resin, and wherein said metal coating is composed of metallic material suitable for forming and maintaining under ambient working conditions a mechanically strong shell for holding together fractional portions of the diamond particles, and effective to increase the adhesion between the diamond particles and said resin materials, and to dissipate heat from said diamond particles.

2. In a method as defined in claim 1 wherein the metal of said coating is selected from the group consisting of cobalt, nickel, silver, cadmium, zinc, copper, iron, tin, molybdenum, titanium, manganese, aluminum, chromium, gold, tungsten, zirconium, platinum group metals, and combinations and alloys containing at least one of said group of metals in combination with one or more other substances.

3. In a method of making a grinding element by embedding individual diamond particles of a size and configuration suitable for abrasive grinding purposes in a resin material suitable for use as a bonding medium and then curing the resin to form the element, the improvement comprising coating the individual particles with a metal to a thickness between 0.5 and 25 microns under pressures less than that required to form the diamonds synthetically prior to embedding the same in the resin to impart to said grinding element a grinding ratio exceeding that of an identical grinding element wherein the particles are free of coating and the element contains said resin material in place of said metal, said coating conforming substantially to the surface configuration of respective ones of said individual particles, said metal being effective to increase the adhesion between the diamond particles and the resin material, to dissipate heat from said diamond particles and to encapsulate said individual diamond particles to keep splintered diamond particle material together.

4. A method for producing resin bonded grinding wheels and the like having diamond particles embedded in the grinding section thereof, comprising the steps of forming on the surface of preformed discrete diamond particles of a size and configuration suitable for abrasive grinding purposes a substantially continuous metallic layer conforming generally to the outer surface configuration of the respective particles to enhance the bonding relation of the diamond particles with the resin bond in which they are intended to be embedded and having a thickness in the order of 0.5 to 25 microns throughout the extent of said layer, said metallic layer being composed of metal or metal alloys having mechanical characteristics capable of holding together fractionated portions of the diamond particle when exposed to external loads and thermal transfer properties capable of reducing temperature peaks generated in the diamond particles during abrasive working conditions and bonding properties capable of increasing the retention of the diamond particles in the resin bond, mixing a quantity of diamond particles having metallic layers formed thereon with resin material suitable for use as a bonding medium, and compacting and curing the mixture of resin material and embedded diamond particles.

5. In a method for producing resin bonded grinding wheels and the like having diamond particles embedded in the grinding section thereof, the improvement comprising the step of forming on the surface of preformed discrete diamond particles of a size and configuration suitable for abrasive grinding purposes a substantially continuous metallic layer conforming generally to the outer surface configuration of the respective particles to enhance the bonding relation of the diamond particles with the resin bond in which they are intended to be embedded and having a thickness in the order of 0.5 to 25 microns throughout the extent of said layer, said metallic layer being composed of metal or metal alloys having mechanical characteristics capable of holding together fractionated portions of the diamond particle when exposed to external loads and thermal transfer properties capable of reducing temperature peaks generated in the diamond particles during abrasive working conditions and bonding properties capable of increasing the retention of the diamond particles in the resin bond.

6. A method for producing resin bonded grinding wheels and the like having diamond particles embedded in the grinding section thereof, comprising the steps of mixing a quantity of diamond particles of a size and configuration suitable for abrasive grinding purposes having individual metallic layers formed on at least a substantial number thereof with resin material suitable for use as a bonding medium to form an abrasive resin matrix having diamond particles embedded therein, the respective metallic layers being formed on the surface of preformed discrete diamond particles in the nature of a substantially continuous shell conforming generally to the outer surface configuration of the respective particles to enhance the bonding relation of the diamond particles with the resin bond in which they are intended to be embedded and having a thickness in the order of 0.5 to 25 microns throughout the extent of said layer, said metallic layer being composed of metal or metal alloys having mechanical characteristics capable of holding together fractionated portions of the diamond particle when exposed to external loads and thermal transfer properties capable of reducing temperature peaks generated in the diamond particles during abrasive working conditions and bonding properties capable of increasing the retention of the diamond particles in the resin bond, and compacting and curing the mixture of resin material and embedded diamond particles.

* * * * *